United States Patent
Park et al.

(10) Patent No.: US 9,971,067 B2
(45) Date of Patent: May 15, 2018

(54) POLARIZING PLATE AND IMAGE DISPLAY APPARATUS COMPRISING SAME

(71) Applicant: LG CHEM, LTD., Seoul (KR)

(72) Inventors: Kwang-Seung Park, Daejeon (KR); Mi-Rin Lee, Daejeon (KR); Jun-Wuk Park, Daejeon (KR); Eun-Soo Huh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 222 days.

(21) Appl. No.: 15/024,706

(22) PCT Filed: Sep. 19, 2014

(86) PCT No.: PCT/KR2014/008732
§ 371 (c)(1),
(2) Date: Mar. 24, 2016

(87) PCT Pub. No.: WO2015/046818
PCT Pub. Date: Apr. 2, 2015

(65) Prior Publication Data
US 2016/0245957 A1    Aug. 25, 2016

(30) Foreign Application Priority Data

Sep. 30, 2013 (KR) ........................ 10-2013-0117037
Sep. 12, 2014 (KR) ........................ 10-2014-0120933

(51) Int. Cl.
*G02B 5/30* (2006.01)
*G02B 1/14* (2015.01)
*G02B 1/08* (2006.01)

(52) U.S. Cl.
CPC ................ *G02B 1/14* (2015.01); *G02B 1/08* (2013.01); *G02B 5/305* (2013.01)

(58) Field of Classification Search
CPC ............. G02B 1/08; G02B 1/14; G02B 5/305
USPC ...................................................... 359/487.02
See application file for complete search history.

(56) References Cited

U.S. PATENT DOCUMENTS

| | | | |
|---|---|---|---|
| 6,683,717 B1* | 1/2004 | Miyatake | C09K 19/3852 349/183 |
| 8,824,047 B2* | 9/2014 | Tomoguchi | G02B 1/105 349/122 |
| 9,428,676 B2* | 8/2016 | Lee | C09J 163/00 |
| 9,790,403 B2* | 10/2017 | Huh | C09J 4/00 |
| 2010/0232018 A1* | 9/2010 | Kobayashi | B32B 7/12 359/488.01 |
| 2014/0072731 A1 | 3/2014 | Seo et al. | |
| 2014/0160406 A1 | 6/2014 | Huh et al. | |
| 2015/0099127 A1 | 4/2015 | Ogawa et al. | |
| 2016/0237317 A1* | 8/2016 | Park | C09J 4/00 |

FOREIGN PATENT DOCUMENTS

| | | |
|---|---|---|
| JP | 2006-163082 A | 6/2006 |
| JP | 2009-008860 A | 1/2009 |
| JP | 2010102310 A | 5/2010 |
| JP | 2013185133 A | 9/2013 |
| KR | 10-2010-0037553 A | 4/2010 |
| KR | 10-2013-0020616 A | 2/2013 |
| KR | 10-2013-0040725 A | 4/2013 |
| KR | 10-2013-0103290 A | 9/2013 |
| TW | 200732712 A | 9/2007 |
| TW | 201343844 A | 11/2013 |

* cited by examiner

*Primary Examiner* — Ricky D Shafer
(74) *Attorney, Agent, or Firm* — Dentons US LLP

(57) ABSTRACT

The present invention relates to a polarizing plate including: a polarizer; and a protective layer formed on at least one surface of the polarizer, in which the protective layer is a cured product of a radical curable composition including: (A) an acid anhydride-based compound having at least one unsaturated double bond between carbons; (B) a vinyl-based compound having at least one electron donor group; (C) a radical initiator; and (D) a cation generator, and an image display device including the same.

15 Claims, 1 Drawing Sheet

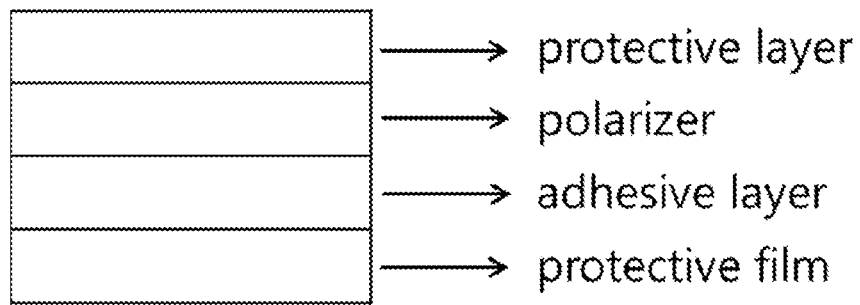

POLARIZING PLATE AND IMAGE DISPLAY APPARATUS COMPRISING SAME

This application is a National Stage Entry of International Application No. PCT/KR2014/008732, filed on Sep. 19, 2014, and claims the benefit of and priority to Korean Application No. 10-2013-0117037, filed on Sep. 30, 2013, and Korean Application No. 10-2014-0120933, filed on Sep. 12, 2014, all of which are incorporated herein by reference in their entirety for all purposes as if fully set forth herein.

TECHNICAL FIELD

The present invention relates to a polarizing plate and an image display device including the same, and more specifically, to a polarizing plate which may secure adhesive strength between a polarizer and a protective layer through a covalent bond instead of a hydrogen bond, and an image display device including the same.

BACKGROUND ART

A polarizing plate has been usually used in a structure, in which a protective film is stacked on both surfaces of a polarizer formed of a polyvinyl alcohol (hereinafter, referred to as 'PVA')-based resin dyed with a dichroic dye or iodine. In this case, a triacetyl cellulose (TAC)-based film has been frequently used as the protective film because the film is excellent in optical transparency or moisture permeability.

Meanwhile, as a liquid crystal display device has recently been developed into a mobile device such as a laptop personal computer, a cellular phone and a car navigation system, it is required that a polarizing plate which constitutes a liquid crystal display device is thin and lightweight. However, in a polarizing plate in which a TAC film and the like are laminated as the protective film as described above, it is difficult to maintain a thickness of the protective film at 20 µm or less from the viewpoint of handling property or durability performance during the operation, so that there is a limitation for the liquid crystal device to be thin and lightweight.

In order to solve the aforementioned problems, a technology has been suggested, in which a transparent thin film layer is formed by forming a protective film on only one surface of a polarizer, and coating an active energy ray curable composition on the other surface thereof. Meanwhile, most of the transparent thin film layers, which have been suggested so far, secure adhesive strength through a hydrogen bond between a hydroxy group of a polarizer formed of a PVA-based resin and a hydrophilic functional group of a transparent thin film layer. However, since water molecules may also form a hydrogen bond with a hydroxy group of the polarizer formed of a PVA-based resin or a hydrophilic functional group of a transparent thin film layer in a high moisture atmosphere when a hydrogen bond is used as described above, there is a disadvantage in that the frequency of hydrogen bonds between a hydroxy group of a polarizer formed of a PVA-based resin and a hydrophilic functional group of a transparent thin film layer is decreased, and accordingly, adhesive strength deteriorates.

In order to solve the aforementioned problems, studies to secure adhesive strength have been actively conducted through a covalent bond instead of a hydrogen bond, and among them, particularly, studies on an active energy ray curable composition including an epoxy compound have been most actively conducted. In the case of an active energy ray curable composition including an epoxy compound, a ring-opening reaction between a hydroxy group of a polarizer formed of a PVA-based resin and an epoxy compound occurs during the curing process by irradiation of UV rays, a covalent bond is generated by the ring-opening reaction, and accordingly, excellent adhesive strength may be secured even in a high moisture atmosphere. However, since an active energy ray curable composition including the epoxy compound is cured by a cationic method instead of by a radical method, the curing rate is slow, and there also many disadvantages in preparation process because the degree of curing is also low.

Therefore, there is a need for a new polarizing plate which may secure adhesive strength through a covalent bond instead of a hydrogen bond, and thus has excellent adhesion between a polarizer and a protective layer, is excellent in water resistance and heat resistance, and may be manufactured as a thin type.

DISCLOSURE

Technical Problem

The present invention has been made in an effort to provide a polarizing plate which may secure adhesive strength through a covalent bond instead of a hydrogen bond, and thus has excellent adhesion between a polarizer and a protective layer, is excellent in water resistance and heat resistance, and may be manufactured as a thin type, and an image display device including the same.

Technical Solution

In one aspect, the present invention provides a polarizing plate including a polarizer, and a protective layer formed on at least one surface of the polarizer, in which the protective layer is a cured product of a radical curable composition including: (A) an acid anhydride-based compound having at least one unsaturated double bond between carbons; (B) a vinyl-based compound having at least one electron donor group; (C) a radical initiator; and (D) a cation generator.

In this case, it is preferred that in the polarizer and the protective layer, adhesive strength is secured through a covalent bond generated as a result of an esterification reaction between a hydroxy group of the polarizer and an acid anhydride group of the protective layer.

Meanwhile, in terms of the content of the acid anhydride-based compound and the vinyl-based compound, a blending equivalent ratio represented by the following Equation (1) is preferably 0.8 to 1.0.

$$\text{Blending equivalent ratio} = M/N \qquad \text{Equation (1):}$$

In Equation (1), M is the number of unsaturated double bonds between carbons, which are capable of participating in a polymerization in a molecule comprising an acid anhydride group comprised in the acid anhydride-based compound; and N is the number of unsaturated double bonds between carbons, which are capable of participating in a polymerization in a molecule comprised in the vinyl-based compound.

Meanwhile, the acid anhydride-based compound may be one or more compounds selected from the group consisting of compounds represented by the following [Formula I] to [Formula IV].

[Formula I]

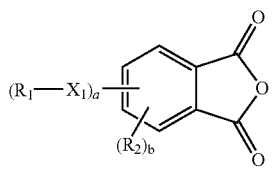

in [Formula I], $R_1$ is a (meth)acryloyl group, a (meth)acryloylalkyl group, or a (meth)acryloyloxy alkyl group; $R_2$ is a halogen atom or a $C_{1~10}$ alkyl group; a is an integer of 1 and 2; b is an integer of 0 to 2; and $X_1$ is a single bond, —O—, —CO—, —COO—, or —OCO—.

[Formula II]

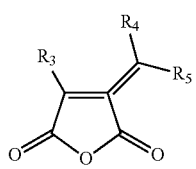

in [Formula II], $R_3$ to $R_5$ are each independently hydrogen or a halogen atom; or a $C_{1~10}$ alkyl group, a $C_{4~14}$ cycloalkyl group, a $C_{6~14}$ aryl group or a combination thereof.

[Formula III]

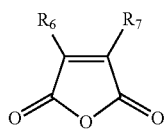

in [Formula III], $R_6$ and $R_7$ are each independently hydrogen or a halogen atom; or a $C_{1~10}$ alkyl group, a $C_{4~14}$ cycloalkyl group, a $C_{6~14}$ aryl group or a combination thereof.

[Formula IV]

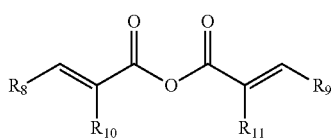

in [Formula IV], $R_8$ to $R_{11}$ are each independently hydrogen or a halogen atom; or a $C_{1~10}$ alkyl group, a $C_{4~14}$ cycloalkyl group, a $C_{6~14}$ aryl group or a combination thereof.

Meanwhile, it is preferred that an electron donor group of the vinyl-based compound is a functional group represented by the following [Formula A] or [Formula B].

[Formula A]

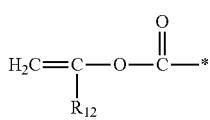

in [Formula A], $R_{12}$ is hydrogen or a $C_{1~10}$ alkyl group.

[Formula B]

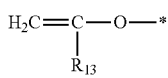

in [Formula B], $R_{13}$ is hydrogen or a $C_{1~10}$ alkyl group.

More specifically, the vinyl-based compound may be a compound represented by the following [Formula V].

[Formula V]

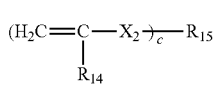

in [Formula V], $R_{14}$ is hydrogen or a $C_{1~10}$ alkyl group; $R_{15}$ is a c-valent $C_{1~10}$ aliphatic chain, a $C_{4~14}$ aliphatic ring, a $C_{6~14}$ aromatic ring, or a combination thereof; c is an integer of 1 to 4; and $X_2$ is —O— or —OCO—.

Meanwhile, the radical curable composition of the present invention may further include a radical polymerizable compound represented by the following [Formula VI].

[Formula VI]

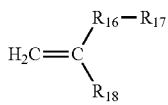

in [Formula VI], $R_{16}$ is an ester group (—COO—), an amide group (—CON—), or a thioate group (—COS—); $R_{17}$ is a $C_{1~10}$ alkyl group, a $C_{4~10}$ cycloalkyl group, or a combination thereof, and in this case, $R_{17}$ has at least one hydroxy substituent in a molecule thereof; and $R_{18}$ is hydrogen, or a $C_{1~10}$ alkyl group.

Meanwhile, it is preferred that 1 to 50 parts by weight of the acid anhydride-based compound and the vinyl-based compound; 40 to 97 parts by weight of the radical polymerizable compound; 1 to 10 parts by weight of the radical initiator; and 1 to 10 parts by weight of the cation generator are included, based on 100 parts by weight of the radical curable composition.

Meanwhile, it is preferred that the radical curable composition after curing has a glass transition temperature of 60° C. or more.

Further, it is preferred that the radical curable composition has a viscosity of 10 to 200 cp.

Meanwhile, it is preferred that the protective layer has a thickness of 0.5 to 20 μm.

Meanwhile, in the polarizing plate of the present invention, a protective film may be further attached, through an adhesive layer, to a surface opposite to a surface of the polarizer, on which a protective layer is formed previously.

In addition, the polarizing plate of the present invention may further include an adhesion layer at the upper portion of the protective layer.

Meanwhile, it is preferred that the polarizer is a polyvinyl alcohol-based film including iodine or a dichroic dye.

In another aspect, the present invention provides an image display device including the polarizing plate.

Advantageous Effects

The polarizing plate of the present invention may secure adhesive strength between a polarizer and a protective layer through a covalent bond instead of a hydrogen bond, and thus has excellent adhesion between the polarizer and the protective layer, and is excellent in water resistance.

Furthermore, the polarizing plate of the present invention may sufficiently protect the polarizer even under a high temperature environment because the protective layer is a cured product of a radical curable composition having a high glass transition temperature, and accordingly, heat resistance of the polarizing plate is excellent.

Further, the polarizing plate of the present invention has a protective layer having a small thickness as compared to a polarizing plate having a transparent protective film in the related art, and thus may be manufactured as a thin-type.

BRIEF DESCRIPTION OF DRAWINGS

FIG. 1 is a diagram illustrating a polarizing plate having a protective layer formed on one surface of a polarizer and a protective film formed the outer surface of the polarizer through an adhesive layer.

MODE FOR INVENTION

Hereinafter, preferred exemplary embodiments of the present invention will be described. However, the exemplary embodiments of the present invention may be modified in various forms, and the scope of the present invention is not limited to the exemplary embodiments which will be described below. Further, exemplary embodiments of the present invention are provided to more completely explain the present invention to a person with ordinary skill in the art.

1. Polarizing Plate

As a result of repeated studies, the present inventors have found that when an acid anhydride-based compound having at least one unsaturated double bond between carbons is mixed with a vinyl-based compound having at least one electron donor group, a radical initiator and a cation generator in a radical curable composition for forming a protective layer and the resulting mixture is used, adhesive strength may be secured through a covalent bond instead of a hydrogen bond, adhesion between a polarizer and a protective layer is excellent, water resistance and heat resistance are excellent, and a polarizing plate may be manufactured as a thin type, thereby completing the present invention.

More specifically, a polarizing plate of the present invention is a polarizing plate including a polarizer, and a protective layer formed on at least one surface of the polarizer, and the protective layer is a cured product of a radical curable composition including: (A) an acid anhydride-based compound having at least one unsaturated double bond between carbons; (B) a vinyl-based compound having at least one electron donor group; (C) a radical initiator; and (D) a cation generator.

In this case, it is preferred that in the polarizer and the protective layer, adhesive strength is secured through a covalent bond generated as a result of an esterification reaction between a hydroxy group of the polarizer and an acid anhydride group of the protective layer. In this case, since in the polarizing plate of the present invention, adhesive strength is secured through a covalent bond between the polarizer and the protective layer, adhesion between the polarizer and the protective layer may be stably maintained even under a high humidity environment.

1-1. Polarizer

First, as the polarizer of the present invention, it is possible to use a polarizer well known in the art, for example, a film composed of polyvinyl alcohol (PVA) including iodine or a dichroic dye. The polarizer may be manufactured by dyeing iodine or a dichromatic dye to the PVA film, but the manufacturing method thereof is not particularly limited. In the present specification, the polarizer refers to a state in which the polarizer does not include a protective layer (or a protective film), and the polarizing plate refers to a state in which the polarizing plate includes a polarizer and a protective layer (or a protective film).

Meanwhile, when the polarizer is a polyvinyl alcohol-based film, the polyvinyl alcohol-based film may be used without particular limitation as long as the film includes a polyvinyl alcohol resin or a derivative thereof. In this case, examples of the derivative of the polyvinyl alcohol resin include, but are not limited to, a polyvinyl formal resin, a polyvinyl acetal resin and the like. Also, as the polyvinyl alcohol-based film, it is also possible to use a commercially available polyvinyl alcohol-based film generally used in the manufacture of a polarizer in the art, for example, P30, PE30 and PE60 manufactured by Kuraray Co., Ltd., and M2000, M3000 and M6000 manufactured by Nippon Synthetic Chemical Industry Co., Ltd., and the like.

Meanwhile, the degree of polymerization of the polyvinyl alcohol-based film may be in a range of 1,000 to 10,000, preferably, in a range of 1,500 to 5,000, but is not limited thereto. This is because when the degree of polymerization satisfies the range, molecules freely move, and may be flexibly mixed with iodine or a dichroic dye, and the like.

1-2. Protective Layer

Next, the protective layer of the present invention is formed by using the radical curable composition in order to support and protect a polarizer, and may be formed by a method well known in the art. For example, the protective layer may be formed by a method of applying the radical curable composition on one surface of a polarizer to form a protective layer by a coating method well known in the art, for example, a method such as spin coating, bar coating, roll coating, gravure coating and blade coating, and then curing the protective layer through irradiation of an active energy ray. In this case, the irradiation method is not particularly limited, and for example, may be performed by irradiating UV light at 10 to about 2,500 mJ/cm$^2$ using a UV light irradiation device (fusion lamp, D bulb).

A. Acid Anhydride-Based Compound

First, the acid anhydride-based compound included in the radical curable composition of the present invention is a component for enabling curing of the composition through radical curing, and furthermore, securing adhesive strength through a covalent bond via an esterification with an hydroxy group of the polarizer, and it is possible to use various acid anhydride-based compounds which may include at least one unsaturated double bond in a molecule thereof to achieve radical curing.

Meanwhile, the at least one unsaturated double bond between carbons of the acid anhydride-based compound is preferably, but is not limited to, an unsaturated double bond conjugated with at least one carbonyl group of an acid anhydride group for better radical curing.

For example, the acid anhydride-based compound in the present invention may be, is not limited to, one or more compounds selected from the group consisting of compounds represented by the following [Formula I] to [Formula IV].

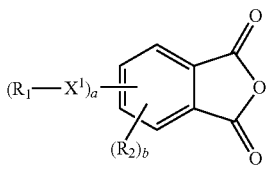

[Formula I]

In [Formula I], $R_1$ is a (meth)acryloyl group, a (meth)acryloylalkyl group, or a (meth)acryloyloxy alkyl group; $R_2$ is a halogen atom or a $C_{1\sim10}$ alkyl group; a is an integer of 1 and 2; b is an integer of 0 to 2; and $X_1$ is a single bond, —O—, —CO—, —COO—, or —OCO—.

In this case, in R1, the alkyl group of the (meth)acryloylalkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. In this case, the (meth)acrylolyl group of the (meth)acryloylalkyl group may be positioned at any position of the alkyl group. That is, the (meth)acryloyl group may be present at a terminal of an alkyl group, or at the middle of an alkyl group. Further, the other hydrogen atoms included in the alkyl group may be substituted with any substituent.

Furthermore, in $R_1$, the alkyl group of the (meth)acryloyloxy alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. In this case, the (meth)acrylolyloxy group of the (meth)acryloyloxy alkyl group may be positioned at any position in an alkyl group. That is, the (meth)acryloyloxy group may be present at a terminal of an alkyl group, or at the middle of an alkyl group. Further, the other hydrogen atoms included in the alkyl group may be substituted with any substituent.

In addition, in R2, the alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. Meanwhile, examples of the alkyl group include, but are not limited to, methyl, ethyl, propyl, butyl, pentyl, hexyl, heptyl, octyl, nonyl, decanyl and the like.

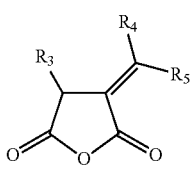

[Formula II]

In [Formula II], $R_3$ to $R_5$ are each independently hydrogen or a halogen atom; or a $C_{1\sim10}$ alkyl group, a $C_{4\sim14}$ cycloalkyl group, a $C_{6\sim14}$ aryl group or a combination thereof.

In this case, in R3 to R5, the alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. Meanwhile, examples of the alkyl group include, but are not limited to, methyl, ethyl, propyl, butyl, pentyl, hexyl, heptyl, octyl, nonyl, decanyl and the like.

In addition, in R3 to R5, the cycloalkyl group refers to a non-aromatic monocyclic, bicyclic or tricyclic hydrocarbon moiety of 4 to 14, or 4 to 10, or 4 to 6 ring carbons, and the cycloalkyl group in the present specification may also include at least one unsaturated bond in a molecule thereof. Meanwhile, examples of the cycloalkyl group include, but are not limited to, a cyclopentane ring, a cyclopentene ring, a cyclohexane ring, a cyclohexene group and the like.

Further, in R3 to R5, the aryl group refers to a monocyclic, bicyclic or tricyclic aromatic hydrocarbon moiety having 6 to 14, or 6 to 12 ring carbons, and examples thereof include, but are not limited to, a benzene ring, a naphthalene ring, an anthracene ring, a biphenyl ring and the like.

Meanwhile, R3 to R5 are limited thereto, but among them, are each independently preferably hydrogen, a halogen atom, or a $C_{1\sim10}$ alkyl group, more preferably hydrogen, a halogen atom, or a $C_{1\sim6}$ alkyl group, and more preferably hydrogen, a halogen atom, or a $C_{1\sim4}$ alkyl group.

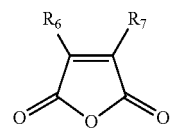

[Formula III]

In [Formula III], $R_6$ and $R_7$ are each independently hydrogen or a halogen atom; or a $C_{1\sim10}$ alkyl group, a $C_{4\sim14}$ cycloalkyl group, a $C_{6\sim14}$ aryl group or a combination thereof.

In this case, in $R_6$ to $R_7$, the alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. Meanwhile, examples of the alkyl group include, but are not limited to, methyl, ethyl, propyl, butyl, pentyl, hexyl, heptyl, octyl, nonyl, decanyl and the like.

In addition, in $R_6$ and $R_7$, the cycloalkyl group refers to a non-aromatic monocyclic, bicyclic or tricyclic hydrocarbon moiety of 4 to 14, or 4 to 10, or 4 to 6 ring carbons, and the cycloalkyl group in the present specification may also include at least one unsaturated bond in a molecule thereof. Meanwhile, examples of the cycloalkyl group include, but are not limited to, a cyclopentane ring, a cyclopentene ring, a cyclohexane ring, a cyclohexene group and the like.

Further, in $R_6$ to $R_7$, the aryl group refers to a monocyclic, bicyclic or tricyclic aromatic hydrocarbon moiety having 6 to 14, or 6 to 12 ring atoms, and examples thereof include, but are not limited to, a benzene ring, a naphthalene ring, an anthracene ring, a biphenyl ring and the like.

Meanwhile, $R_6$ to $R_7$ are limited thereto, but among them, are each independently preferably hydrogen, a halogen atom, or a $C_{1\sim10}$ alkyl group, more preferably hydrogen, a halogen atom, or a $C_{1\sim6}$ alkyl group, and more preferably hydrogen, a halogen atom, or a $C_{1\sim4}$ alkyl group.

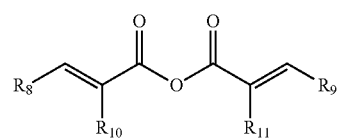

[Formula IV]

In [Formula IV], $R_8$ to $R_{11}$ are each independently hydrogen or a halogen atom; or a $C_{1\sim10}$ alkyl group, a $C_{4\sim14}$ cycloalkyl group, a $C_{6\sim14}$ aryl group or a combination thereof.

In this case, in $R_8$ to $R_{11}$, the alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. Meanwhile, examples of the alkyl group include, but are not limited to, methyl, ethyl, propyl, butyl, pentyl, hexyl, heptyl, octyl, nonyl, decanyl and the like.

In addition, in $R_8$ to $R_{11}$, the cycloalkyl group refers to a non-aromatic monocyclic, bicyclic or tricyclic hydrocarbon moiety of 4 to 14, or 4 to 10, or 4 to 6 ring carbons, and the cycloalkyl group in the present specification may also include at least one unsaturated bond in a molecule thereof. Meanwhile, examples of the cycloalkyl group include, but are not limited to, a cyclopentane ring, a cyclopentene ring, a cyclohexane ring, a cyclohexene group and the like.

Further, in $R_8$ to $R_{11}$, the aryl group refers to a monocyclic, bicyclic or tricyclic aromatic hydrocarbon moiety having 6 to 14, or 6 to 12 ring carbons, and examples thereof include, but are not limited to, a benzene ring, a naphthalene ring, an anthracene ring, a biphenyl ring and the like.

Meanwhile, $R_8$ to $R_{11}$ are limited thereto, but among them, are each independently preferably hydrogen, a halogen atom, or a $C_{1\sim10}$ alkyl group, more preferably hydrogen, a halogen atom, or a $C_{1\sim6}$ alkyl group, and more preferably hydrogen, a halogen atom, or a $C_{1\sim4}$ alkyl group.

More specifically, the compound represented by [Formula I] to [Formula IV] is not limited to, but may be, for example, a compound represented by the following [Formula 1] to [Formula 6] and the like. These compounds may be used either alone or in a mixture.

[Formula 1]

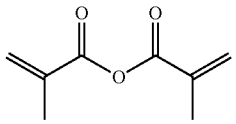

[Formula 2]

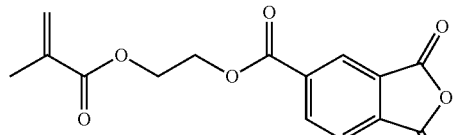

[Formula 3]

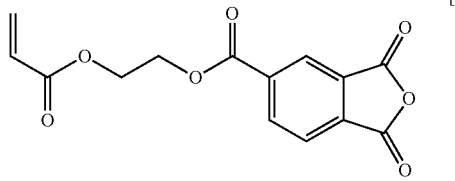

[Formula 4]

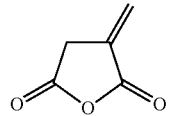

[Formula 5]

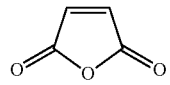

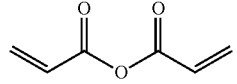

[Formula 6]

B. Vinyl-Based Compound

Next, the vinyl-based compound included in the radical curable composition of the present invention forms a charge complex with the acid anhydride-based compound by an electron donor group when the radical curable composition is cured, and as a result, the vinyl-based compound allows radical curing to occur very effectively through a copolymerization reaction with the acid anhydride-based compound.

Meanwhile, the vinyl-based compound may be used without particular limitation as long as the compound may have an electron donor group to form a charge complex with the acid anhydride-based compound when the radical curable composition is cured. However, in the present specification, the vinyl-based compound refers to a compound excluding compounds overlapped with a radical polymerizable compound to be described below except for the examples enumerated below.

Meanwhile, an electron donor group of the vinyl-based compound is preferably, but is not limited to, a functional group represented by the following [Formula A] or [Formula B]. This is because the vinyl-based compound may form a charge complex with the acid anhydride-based compound excellently.

[Formula A]

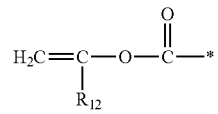

In [Formula A], $R_{12}$ is hydrogen or a $C_{1\sim10}$ alkyl group.

In this case, in R12, the alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. Meanwhile, examples of the alkyl group include, but are not limited to, methyl, ethyl, propyl, butyl, pentyl, hexyl, heptyl, octyl, nonyl, decanyl and the like.

[Formula B]

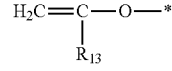

in [Formula B], $R_{13}$ is hydrogen or a $C_{1\sim10}$ alkyl group.

In this case, in R13, the alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. Meanwhile, examples of the alkyl group include, but are not limited to, methyl, ethyl, propyl, butyl, pentyl, hexyl, heptyl, octyl, nonyl, decanyl and the like.

For example, the vinyl-based compound in the present invention may be, but is not limited to, a compound represented by the following [Formula V].

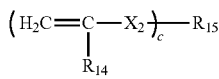

[Formula V]

in [Formula V], $R_{14}$ is hydrogen or a $C_{1\sim10}$ alkyl group; $R_{15}$ is a c-valent $C_{1\sim10}$ aliphatic chain, a $C_{4\sim14}$ aliphatic ring, a $C_{6\sim14}$ aromatic ring, or a combination thereof; c is an integer of 1 to 4; and $X_2$ is —O— or —OCO—.

In this case, in R14, the alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. Meanwhile, examples of the alkyl group include, but are not limited to, methyl, ethyl, propyl, butyl, pentyl, hexyl, heptyl, octyl, nonyl, decanyl and the like.

In addition, in $R_{15}$, the aliphatic chain refers to a straight-chained or branch-chained saturated or unsaturated trivalent hydrocarbon moiety having 1 to 10, or 1 to 8, or 1 to 4 carbon atoms, and examples thereof include, but are not limited to, a trivalent alkane chain such as a methane chain, an ethane chain, a propane chain, a butane chain, a pentane chain, a hexane chain, a heptane chain, an octane chain, a nonane chain and a decane chain, and the like. One or more hydrogen atoms included in the aliphatic hydrocarbon chain may be substituted with any substituent.

Furthermore, in $R_{15}$, the aliphatic ring refers to a saturated or unsaturated non-aromatic trivalent monocyclic, bicyclic or tricyclic hydrocarbon moiety of 4 to 14, or 4 to 10, or 4 to 6 ring carbons, and examples thereof include, but are not limited to, a trivalent cycloalkane ring such as a cyclopentane ring and a cyclohexane ring, or a trivalent cycloalkene ring such as a cyclopentene ring, a cyclohexene ring and a cyclooctene ring, and the like. One or more hydrogen atoms included in the aliphatic hydrocarbon ring may be substituted with any substituent.

Further, in $R_{15}$, the aromatic ring refers to a trivalent monocyclic, bicyclic or tricyclic aromatic hydrocarbon moiety having 6 to 14, or 6 to 12 ring atoms, and examples thereof include, but are not limited to, a trivalent benzene ring, a trivalent naphthalene ring, a trivalent anthracene ring, a trivalent biphenyl ring and the like. One or more hydrogen atoms included in the aromatic hydrocarbon ring may be substituted with any substituent.

More specifically, the compound represented by [Formula V] is not limited to, but may be, for example, a compound represented by the following [Formula 7] to [Formula 17] and the like. These compounds may be used either alone or in a mixture.

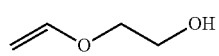

[Formula 7]

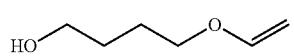

[Formula 8]

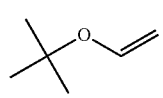

[Formula 9]

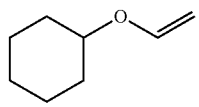

[Formula 10]

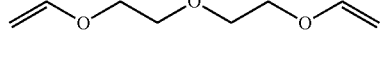

[Formula 11]

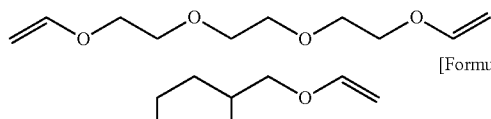

[Formula 12]

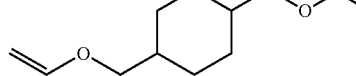

[Formula 13]

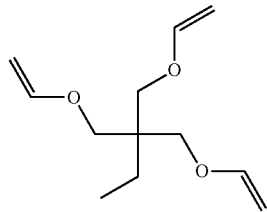

[Formula 14]

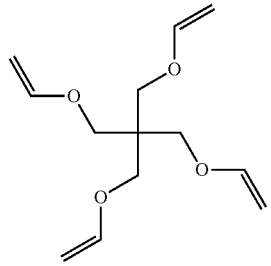

[Formula 15]

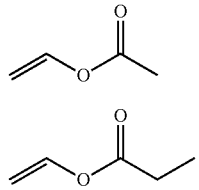

[Formula 16]

[Formula 17]

C. Blending Equivalent Ratio

Meanwhile, in terms of the content of the acid anhydride-based compound and the vinyl-based compound, a blending equivalent ratio represented by the following Equation (1) is preferably 0.8 to 1.0, more preferably 0.9 to 1.0, and particularly preferably 1.0.

Blending equivalent ratio=$M/N$    Equation (1):

M is the number of unsaturated double bonds between carbons, which may participate in a polymerization in a molecule including an acid anhydride group included in the acid anhydride-based compound, and N is the number of unsaturated double bonds between carbons, which may participate in a polymerization in a molecule included in the vinyl-based compound.

For example, in the radical curable composition, the number M of unsaturated double bonds between carbons included in the acid anhydride-based compound, which may participate in a polymerization, becomes a sum of (number of unsaturated double bonds between carbons, which may participate in a polymerization of each acid anhydride-based compound)×(molar fraction of this acid anhydride-based compound), and the number N of double bonds between carbons included in the vinyl-based compound, which may participate in a polymerization, becomes a sum of (number of unsaturated double bonds between carbons, which may participate in a polymerization of each vinyl-based compound)×(molar fraction of this vinyl-based compound).

In the radical curable composition of the present invention, when the acid anhydride-based compound and the vinyl-based compound are included so as to satisfy the range of the blending equivalent ratio as described above, the acid anhydride-based compound and the vinyl-based compound may form a charge complex, and as a result, radical curing by copolymerization may be excellently achieved.

D. Radical Initiator

Next, the radical initiator included in the radical curable composition according to the present invention is for promoting the radical polymerizability to enhance the curing rate, and as the radical initiator, radical initiators generally used in the art may be used without limitation.

More specifically, the radical initiator may be, for example, one or more selected from the group consisting of 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, methylbenzoylformate, oxy-phenyl-acetic acid-2-[2 oxo-2-phenyl-acetoxy-ethoxy]-ethyl ester, oxy-phenyl-acetic acid-2-[2-hydroxy-ethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl (2,4,6-trimethylbenzoyl)-phosphine oxide, phosphine oxide, and phenylbis(2,4,6-trimethylbenzoyl)-phosphineoxide. Particularly in the present invention, phenylbis(2,4,6-trimethylbenzoyl)-phosphineoxide may be preferably used.

Meanwhile, the content of the radical initiator is preferably, for example, in a range of 1 to 10 parts by weight, 1 to 5 parts by weight, or 2 to 4 parts by weight, based on 100 parts by weight of the radical curable composition. This is because the radical curable composition may be smoothly cured when the content of the radical initiator satisfies the numerical range.

E. Cation Generator

Next, the cation generator included in the radical curable composition according to the present invention serves as a catalyst to transfer a cation ($H^+$) to the acid anhydride-based compound when the radical curable composition is cured to promote an esterification with a hydroxy group of a polarizer, and since the present invention uses a cation generator as described above, excellent adhesive strength with the polarizer may be secured through a covalent bond generated by the esterification even under a low temperature condition.

In this case, the cation generator which may be used in the present invention is preferably a cation generator which includes, for example, a sulfonium salt or an iodonium salt. Specific examples of the cation generator including the sulfonium salt or the iodonium salt include, for example, one or more selected from the group consisting of diphenyl(4-phenylthio)phenylsulfonium hexafluoroantimonate, diphenyl(4-phenylthio)phenylsulfonium hexafluorophosphate, (phenyl)[4-(2-methylpropyl)phenyl]-iodonium hexafluorophosphate, (thiodi-4,1-phenylene)bis(diphenylsulfonium) dihexafluoroantimonate, and (thiodi-4,1-phenylene)bis(diphenylsulfonium) dihexafluorophosphate, but are not limited thereto.

Meanwhile, the content of the cation generator may be, for example, 10 parts by weight or less, preferably 1 to 10 parts by weight, 2 to 8 parts by weight, or 2 to 6 parts by weight, based on 100 parts by weight of the radical curable composition. This is because when the cation generator is included in a content in the numerical range in the radical curable composition according to the present invention, the esterification is well achieved.

F. Additional Composition

Meanwhile, the radical curable composition of the present invention may further include a radical polymerizable compound represented by the following [Formula VI] such that the protective layer film may be further hardened through a reaction of the hydroxy group with the acid anhydride while excellent adhesion is maintained.

[Formula VI]

in [Formula VI], $R_{16}$ is an ester group (—COO—), an amide group (—CON—), or a thioate group (—COS—); $R_{17}$ is a $C_{1\sim 10}$ alkyl group, a $C_{4\sim 10}$ cycloalkyl group, or a combination thereof, and in this case, $R_{17}$ has at least one hydroxy substituent in a molecule thereof; and $R_{18}$ is hydrogen, or a $C_{1\sim 10}$ alkyl group.

In this case, in $R_{17}$, the alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. Meanwhile, examples of the alkyl group include, but are not limited to, methyl, ethyl, propyl, butyl, pentyl, hexyl, heptyl, octyl, nonyl, decanyl and the like.

Furthermore, in $R_{17}$, the cycloalkyl group refers to a non-aromatic monocyclic, bicyclic or tricyclic hydrocarbon moiety of 4 to 14, or 4 to 10, or 4 to 6 ring carbons, and the cycloalkyl group in the present specification may also include at least one unsaturated bond in a molecule thereof. Meanwhile, examples of the cycloalkyl group include, but are not limited to, a cyclopentane ring, a cyclohexane ring and the like.

Meanwhile, the hydroxy group may be substituted at any position in an alkyl group or a cycloalkyl group. For example, the hydroxy group may be present at a terminal of an alkyl group, or at the middle of an alkyl group. Meanwhile, the other hydrogen atoms included in the alkyl group or the cycloalkyl group may be substituted with any substituent.

In addition, in $R_{18}$, the alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. Meanwhile, examples of the alkyl group include, but are not limited to, methyl, ethyl, propyl, butyl, pentyl, hexyl, heptyl, octyl, nonyl, decanyl and the like. One or more hydrogen atoms included in the alkyl group may be substituted with any substituent.

More specifically, the radical polymerizable compound may be, but is not limited to, for example, a compound represented by the following [Formula 18] to [Formula 28] and the like. These compounds may be used either alone or in a mixture.

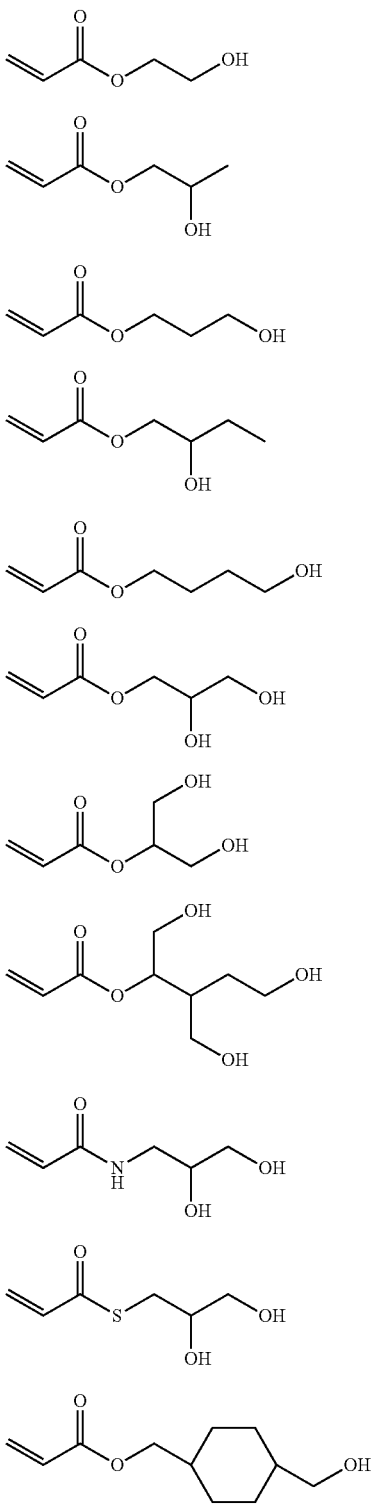

Meanwhile, when the radical polymerizable compound is further included as described above, it is preferred that the radical curable composition of the present invention includes: 1 to 50 parts by weight of the acid anhydride-based compound and the vinyl-based compound; 40 to 97 parts by weight of the radical curable compound; 1 to 10 parts by weight of a radical initiator; and 1 to 10 parts by weight of a cation generator, based on 100 parts by weight of the entire composition. In this case, the content of the acid anhydride-based compound and the vinyl-based compound refers to the total content of the two compounds added in the equivalent ratio as described above.

More specifically, the content of the acid anhydride-based compound and the vinyl-based compound may be 1 to 50 parts by weight, preferably 5 to 45 parts by weight, and more preferably 10 to 40 parts by weight, based on 100 parts by weight of the entire composition. When the acid anhydride-based compound and the vinyl-based compound are included in the content in the numerical range, adhesion is particularly excellent, and a problem such as an increase in viscosity does not occur.

Furthermore, the content of the radical polymerizable compound may be 40 to 97 parts by weight, preferably 45 to 90 parts by weight, and more preferably 50 to 80 parts by weight, based on 100 parts by weight of the entire composition. When the radical polymerizable compound is included in a content in the numerical range, better adhesion may be secured.

Further, the content of the radical initiator may be 1 to 10 parts by weight, preferably 1 to 5 parts by weight, and more preferably 2 to 4 parts by weight, based on 100 parts by weight of the entire composition. When the content of the radical initiator is included in the content in the numerical range, the composition may be smoothly cured.

In addition, the content of the cation generator may be 1 to 10 parts by weight, preferably 2 to 8 parts by weight, and more preferably 2 to 6 parts by weight, based on 100 parts by weight of the entire composition. When the cation generator is included in the content in the numerical range, the esterification may effectively occur.

G. Physical Properties of Composition

Meanwhile, the glass transition temperature of the cationic curable composition after curing is preferably 60° C. or more, and may be, for example, 60 to 220° C., 65 to 150° C. or 70 to 120° C. This is because a protective layer formed is very thermally stable, and a polarizing plate including the same is excellent in heat resistance.

Furthermore, it is preferred that the radical curable composition has a viscosity of 10 to 200 cP or 20 to 100 cP. When the viscosity of the composition satisfies the numerical range, there is an advantage in that workability is excellent because the protective layer may be thinly formed, and has a low viscosity.

Meanwhile, the thickness of a protective film formed by using the radical curable composition is preferably 0.5 to 20 μm, and may be, for example, 0.5 to 15 μm or 0.5 to 10 μm. This is because a polarizing plate manufactured may become thin and lightweight when the thickness of the protective layer satisfies the range. When the thickness is less than 0.5 μm, thermal impact stability and curl characteristics of the polarizer are vulnerable, and when the thickness is 20 μm or more, it is difficult to make the polarizing plate thin and lightweight.

1-3. Protective Film

Meanwhile, the polarizing plate of the present invention may further include a protective film on one surface of the polarizer, if necessary. More specifically, when a protective layer is formed on one surface of the polarizer in the polarizing plate of the present invention, a separate protective film may be attached, through an adhesive layer, to a surface opposite to the surface, on which the protective layer is formed, in order to support and protect the polarizer.

In this case, the protective film is provided for supporting and protecting a polarizer, and it is possible to use protective films formed of various materials generally known in the art, for example, a cellulose-based film, a polyethylene terephthalate (PET) film, a cycloolefin polymer (COP) film, an acrylic film and the like without limitation. Among them, it is particularly preferred that an acrylic film is used in consideration of optical properties, durability, economic efficiency and the like.

Meanwhile, the acrylic film which may be used in the present invention may be obtained by molding a molding material including a (meth)acrylate-based resin as a main component by extrusion molding. In this case, the (meth) acrylate-based resin includes a resin including a (meth) acrylate-based unit as a main component, and is a concept which includes not only a homopolymer resin composed of a (meth)acrylate-based unit but also a copolymer resin in which other monomer units other than the (meth)acrylate-based unit are copolymerized, and a blend resin in which other resins are blended with the aforementioned (meth) acrylate-based resin.

Meanwhile, the (meth)acrylate-based unit may be, for example, an alkyl(meth)acrylate-based unit. Here, the alkyl (meth)acrylate-based unit refers to both an alkyl acrylate-based unit and an alkyl methacrylate-based unit, and the alkyl group of the alkyl(meth)acrylate-based unit has preferably 1 to 10 carbon atoms, and more preferably 1 to 4 carbon atoms.

Further, examples of a monomer unit capable of being copolymerized with the (meth)acrylate-based unit include a styrene-based unit, a maleic anhydride-based unit, a maleimide-based unit and the like. In this case, examples of the styrene-based unit include, but are not limited to, styrene, α-methylstyrene and the like; examples of the maleic anhydride-based monomer include, but are not limited to, maleic anhydride, methyl maleic anhydride, cyclohexyl maleic anhydride, phenyl maleic anhydride, and the like; and examples of the maleimide-based monomer include, but are not limited to, maleimide, N-methyl maleimide, N-cyclohexyl maleimide, N-phenyl maleimide and the like. These may be used either alone or in a mixture.

Meanwhile, the acrylic film may be a film including a (meth)acrylate-based resin having a lactone ring structure. Specific examples of the (meth)acrylate-based resin having a lactone ring structure include (meth)acrylate-based resins having a lactone ring structure, which are described in, for example, the official gazettes of Japanese Patent Application Laid-Open Nos. 2000-230016, 2001-151814, and 2002-120326, and the like.

The method of manufacturing the acrylic film is not particularly limited, and for example, the acrylic film may be manufactured by sufficiently mixing a (meth)acrylate-based resin, other polymers, an additive and the like by any appropriate mixing method to manufacture a thermoplastic resin composition, and then film-molding the resin composition, or may also be manufactured by preparing the (meth) acrylate-based resin, other polymers, an additive and the like in separate solutions, mixing the solutions to form a homogeneous mixture solution, and then film-molding the mixture solution. In addition, the acrylic film may be an unstretched film, or a stretched film. The stretched film may be a uniaxially stretched film or a biaxially stretched film, and the biaxially stretched film may be a simultaneous biaxially stretched film or a sequential biaxially stretched film.

Meanwhile, the polarizing plate of the present invention may further include a primer layer between the adhesive layer and the protective film in order to further enhance adhesive strength. In this case, the primer layer may be formed by a method of applying a coating solution including a water-dispersible polymer resin, a water-dispersible particulate and water on a protective film by using a bar coating method, a gravure coating method and the like, and drying the coating solution. The water-dispersible polymer resin may be, for example, a water-dispersible polyurethane-based resin, a water-dispersible acrylic resin, a water-dispersible polyester-based resin or a combination thereof, and the like, and for the water-dispersible particulate, it is possible to use an inorganic-based particulate such as silica, titania, alumina and zirconia, or an organic-based particulate composed of a silicone-based resin, a fluorine-based resin, a (meth)acrylic resin, a crosslinked polyvinyl alcohol and a melamine-based resin, or a combination thereof, but the particulate is not limited thereto.

Meanwhile, the polarizer and the protective film may be attached by a method of applying an adhesive on the surface of the polarizer or the protective film by using a roll coater, a gravure coater, a bar coater, a knife coater, or a capillary coater, and the like, and then heating and paper-laminating the polarizer or the protective film by a laminated paper roll, or laminating paper by compressing the polarizer or the protective film at normal temperature, a method of irradiating UV after the paper-lamination, or the like. Meanwhile, as the adhesive, various adhesives for a polarizing plate used in the art, for example, a polyvinyl alcohol-based adhesive, a polyurethane-based adhesive, an acrylic adhesive, a cationic or radical adhesive and the like may be used without limitation.

1-4. Adhesion Layer

Meanwhile, the polarizing plate of the present invention may include an adhesion layer at the upper portion of the protective layer, if necessary, for attachment to an optical film such as a display device panel or a phase difference film.

In this case, the adhesion layer may be formed by using various gluing agents well known in the art, and the kind thereof is not particularly limited. For example, the adhesion layer may be formed by using a rubber-based gluing agent, an acrylic gluing agent, a silicone-based gluing agent, a urethane-based gluing agent, a polyvinyl alcohol-based gluing agent, a polyvinyl pyrrolidone-based gluing agent, a polyacryl amide-based gluing agent, a cellulose-based gluing agent, a vinyl alkyl ether-based gluing agent and the like. Among them, it is particularly preferred that an acrylic film is used in consideration of transparency, heat resistance and the like.

Meanwhile, the adhesion layer may be formed by a method of applying a gluing agent at the upper portion of the protective layer, and may also be formed by a method of attaching an adhesion sheet, which is manufactured by applying a gluing agent on a release sheet, and then drying the gluing agent, at the upper portion of the protective layer.

2. Image Display Device

The aforementioned polarizing plate of the present invention may be usefully applied to an image display device such as a liquid crystal display device. The image display device may be, for example, a liquid crystal display device including a liquid crystal panel and polarizing plates each provided on both surfaces of the liquid crystal panel, and in this case, at least one of the polarizing plates may be the polarizing plate according to the present invention. In this case, the kind of the liquid crystal panel included in the liquid crystal display device is not particularly limited. For example, it is possible to apply all the publicly known panels such as a passive matrix type panel such as a twisted nematic (TN)-type, a super twisted nematic (STN)-type, a ferroelectric (F)-type, or a polymer dispersed (PD)-type; an active matrix type panel such as a two terminal or three terminal; an in plane switching (IPS) panel and a vertical alignment (VA) panel without being limited to the kind thereof. Furthermore, the kinds of other configurations which constitute the liquid crystal display device, for example, the kinds of upper and lower substrates (e.g., a color filter substrate, or an array substrate) and the like are not particularly limited, and the configuration publicly known in the field may be adopted without limitation.

BEST MODE

Hereinafter, the present invention will be described in more detail with reference to specific Examples.

Preparation Example 1—Manufacture of Acrylic Protective Film

A raw material pellet was manufactured by supplying a resin composition, in which poly(N-cyclohexylmaleimide-co-methylmethacrylate), a styrene-maleic anhydride copolymer resin and a phenoxy-based resin were uniformly mixed with each other at a weight ratio of 100:2.5:5, to a 240 extruder in which a portion from a raw material hopper to the extruder was substituted with nitrogen, and melting the mixed resin composition at 250° C.

PKFE (Mw=60,000, Mn=16,000, Tg=95° C.) manufactured by InChemRez® Co., Ltd., was used as the phenoxy-based resin, Dylaeck 332 with a content of 85 wt % of styrene and 15 wt % of anhydrous maleic anhydride was used as the styrene-maleic anhydride copolymer resin, and as the poly(N-cyclohexylmaleimide-co-methylmethacrylate) resin, a resin with a content of 6.5 wt % of N-cyclohexylmaleimide as a result of NMR analysis was used.

The obtained raw material pellet was dried under vacuum, melted by the extruder at 260° C., allowed to pass through a coat hanger-type T-die, and allowed to pass through a chrome plating casting roll and a drying roll and the like to manufacture a film having a thickness of 150 μm. A pilot stretching device was used to stretch the film at a ratio of 170% in the MD direction at 125° C. by using the difference between speeds of the rolls, thereby manufacturing an acrylic film.

After the acrylic film manufactured by the aforementioned process was subjected to corona treatment, a primer composition, in which 20 parts by weight of an oxazoline crosslinking agent (Nippon Shokubai Co., Ltd., WS700) was added to a primer composition with a solid content of 10 wt % that is prepared by diluting CK-PUD-F (Chokwang urethane dispersion) with pure water, was coated on one surface of the acrylic film with a #7 bar, and then the acrylic film was stretched at a ratio of 190% in a TD direction at 130° C. using a tenter, thereby finally manufacturing an acrylic protective film having a primer layer thickness of 400 nm.

Preparation Example 2—Preparation of Radical Curable Composition (1) Radical Curable Composition a Radical curable composition A was prepared by mixing 20 parts by weight of an itaconic acid anhydride, 15 parts by weight of 2-hydroxyethylvinylether, 57 parts by weight of 2-hydroxyethyl acrylate, 3 parts by weight of a radical initiator (Irgacure 819), and 5 parts by weight of diphenyl (4-phenylthio)phenylsulfonium hexafluoroantimonate which is a cation generator.

(2) Radical Curable Composition B

Radical curable composition B was prepared by mixing 20 parts by weight of a maleic anhydride, 15.7 parts by weight of 2-hydroxyethylvinylether, 56.3 parts by weight of 2-hydroxyethyl acrylate, 3 parts by weight of a radical initiator (Irgacure 819), and 5 parts by weight of a cation generator diphenyl(4-phenylthio)phenylsulfonium hexafluoroantimonate.

(3) Radical Curable Composition C

Radical curable composition C was prepared by mixing 20 parts by weight of a maleic anhydride, 15.3 parts by weight of vinyl acetate, 56.7 parts by weight of 2-hydroxyethyl acrylate, 3 parts by weight of a radical initiator (Irgacure 819), and 5 parts by weight of a cation generator diphenyl(4-phenylthio)phenylsulfonium hexafluoroantimonate.

(4) Radical Curable Composition D

Radical curable composition D was prepared by mixing 20 parts by weight of acrylomorpholine, 40 parts by weight of hydroxyethyl acrylamide, 37 parts by weight of hydroxyethyl acrylate, and 3 parts by weight of a radical initiator (Irgacure 819).

Example 1

Radical curable composition A was applied on a primer layer of an acrylic film-based protective film prepared in Preparation Example 1 by using a dropper, and lamination was performed on one surface of a polarizer (PVA device), a condition was set such that the thickness of the final adhesive layer became 1 to 2 μm, and the film was allowed to pass through a laminator (5 m/min). Then, a polarizing plate including a protective film on one surface of a polarizer was manufactured by irradiating UV light with 900 mJ/cm$^2$ on a surface, on which the acrylic film was laminated, using a UV irradiation device (fusion lamp, D bulb).

Next, Radical curable composition A was applied on the other surface of the side of the PVA device of the polarizing plate manufactured on which the protective film was laminated, a PET film having a release force was laminated, a condition was set such that the thickness of the final protective layer became 5 to 6 μm, and then the film was allowed to pass through a laminator (5 m/min). Then, a polarizing plate including a protective film on one surface of a polarizer and a protective layer on the other surface thereof was manufactured by irradiating UV light with 900 mJ/cm$^2$ on a surface, on which a release PET film was laminated, using a UV irradiation device (fusion lamp, D bulb), and removing the PET film. The polarizing plate was manufactured under a constant temperature and constant humidity environment of a temperature of 20° C. and a humidity of 50%.

Example 2

A polarizing plate was manufactured in the same manner as in Example 1, except that Radical Curable Composition B was used instead of Radical Curable Composition A.

Example 3

A polarizing plate was manufactured in the same manner as in Example 1, except that Radical Curable Composition C was used instead of Radical Curable Composition A.

Comparative Example

A polarizing plate was manufactured in the same manner as in Example 1, except that Radical Curable Composition D was used instead of Radical Curable Composition A.

The blending equivalent ratio represented by Equation (1) of the acid anhydride-based compound and the vinyl-based compound of the radical curable composition used in Examples 1 to 3 was calculated, and is shown in the following [Table 1]. In this case, the number M of unsaturated double bonds between carbons included in the acid anhydride-based compound, which may participate in a polymerization, was calculated as a sum of (number of unsaturated double bonds between carbons, which may participate in a polymerization of each acid anhydride-based compound)×(molar fraction of the corresponding acid anhydride-based compound), and the number N of double bonds between carbons included in the vinyl-based compound, which may participate in a polymerization, was calculated as a sum of (number of unsaturated double bonds between carbons, which may participate in a polymerization of each vinyl-based compound)×(molar fraction of the corresponding vinyl-based compound).

Further, the following experiment was performed in order to measure the adhesion, thermal impact stability, glass transition temperature, water resistance and the like of the protective layers of the polarizing plates manufactured in Examples 1 to 3 and Comparative Example. The results are shown in the following [Table 1].

1. Evaluation of adhesion: The radical curable compositions used in Examples 1 to 3 and the Comparative Example were applied on a polarizer (PVA device), a polarizer (PVA device) was laminated thereon to allow the resulting film to pass through a laminator, and UV light with 900 mJ/cm² was irradiated thereon by using a UV irradiation device (fusion lamp, D bulb) to manufacture a peel strength sample composed of the polarizer/the protective layer/the polarizer. The manufactured sample was cut into a width of 20 mm and a length of 100 mm, and then a peel strength was measured during the peeling-off at a speed of 300 mm/min and an angle of 90 degrees by using a Texture Analyzer apparatus (TA-XT manufactured by Stable Micro System Co.), and the cases in which the peel strength was more than 1 N/cm, 0.5 N/cm to 1.0 N/cm, and less than 0.5 N/cm were indicated as excellent, good, and bad, respectively. Meanwhile, the experiment was performed under a constant temperature and constant humidity environment of a temperature of 20° C. and a humidity of 50%.

2. Evaluation of Water Resistance: The polarizing plates in Examples 1 to 3 and the Comparative Example were laminated on a glass substrate, and then immersed in a thermostat at 60° C. The water resistance was judged by observing whether the end portions of the polarizing plate had been discolored after 24 hours, and the cases in which no change was observed and discoloration occurred were indicated as excellent and bad, respectively.

3. Evaluation of Thermal Impact Properties: The evaluation was performed by repeating 100 times a process of laminating the polarizing plates manufactured in Examples 1 to 3 and the Comparative Example on a glass substrate, leaving the laminates to stand at −40° C. for 30 minutes, and then leaving the laminates to stand again at 80° C. for 30 minutes. Then, it was visually evaluated whether the external appearance of the polarizing plate changed. The cases, in which cracks with a size of 2 mm or less were generated only at the end portions, cracks with a short line shape of 5 mm or more were only confirmed at the portions other than the end portions, and a plurality of cracks was generated on the entire surface of the polarizing plate in the external appearance of the polarizing plate, were indicated as excellent, good, and bad, respectively.

4. Measurement of Glass Transition Temperature: The protective layers of the polarizing plates in Examples 1 to 3 and the Comparative Example, which were manufactured under the aforementioned curing conditions, were separated, and then the temperature was increased to −30 to 200° C. to measure the glass transition temperature at a second run by using a differential scanning calorimeter (manufactured by DSC Mettler Inc.).

TABLE 1

| Classification | Composition | Blending equivalent ratio | Thickness of protective layer [μm] | Adhesion | Water resistance | Glass transition temperature [° C.] | Thermal impact stability |
|---|---|---|---|---|---|---|---|
| Example 1 | A | 1 (M:N = 1:1) | 5 | Excellent | Excellent | 67 | Excellent |
| Example 2 | B | 1 (M:N = 1:1) | 5 | Good | Excellent | 63 | Good |
| Example 3 | C | 1 (M:N = 1:1) | 5 | Excellent | Excellent | 74 | Excellent |
| Comparative Example | D | — | 5 | Excellent | Bad | 76 | Excellent |

As shown in Table 1, it can be seen that Examples 1 to 3 of the present invention are excellent in adhesion, thermal impact stability, water resistance and the like, and have a high glass transition temperature. However, it can be seen that Comparative Example, in which adhesive strength is secured through a hydrogen bond, is excellent in adhesion, but is very poor in terms of water resistance.

As described above, exemplary embodiments of the present invention have been described in detail, but it will be obvious to a person with ordinary skill in the art that the scope of the present invention is not limited thereto, and various modifications and changes may be made without departing from the technical spirit of the present invention described in the claims.

The invention claimed is:

1. A polarizing plate comprising:
   a polarizer; and
   a protective layer formed on at least one surface of the polarizer,
   wherein the protective layer is a cured product of a radical curable composition comprising: (A) an acid anhydride-based compound having at least one unsaturated double bond between carbons; (B) a vinyl-based compound having at least one electron donor group; (C) a radical initiator; and (D) a cation generator.

2. The polarizing plate of claim 1, wherein in the polarizer and the protective layer, adhesive strength is secured through a covalent bond generated as a result of an esterification reaction between a hydroxy group of the polarizer and an acid anhydride group of the protective layer.

3. The polarizing plate of claim 1, wherein in terms of a content of the acid anhydride-based compound and the vinyl-based compound, a blending equivalent ratio represented by the following Equation (1) is 0.8 to 1.0;

Blending equivalent ratio=$M/N$,   Equation (1):

wherein in Equation (1), M is the number of unsaturated double bonds between carbons, which are capable of participating in a polymerization in a molecule comprising an acid anhydride group comprised in the acid anhydride-based compound; and N is the number of unsaturated double bonds between carbons, which are capable of participating in a polymerization in a molecule comprised in the vinyl-based compound.

4. The polarizing plate of claim 1, wherein the acid anhydride-based compound is one or more compounds selected from the group consisting of compounds represented by the following [Formula I] to [Formula IV]:

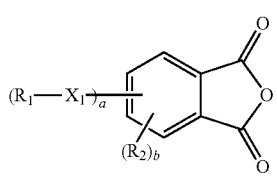

[Formula I]

wherein in [Formula I], $R_1$ is a (meth)acryloyl group, a (meth)acryloylalkyl group, or a (meth)acryloyloxy alkyl group; $R_2$ is a halogen atom or a $C_{1\sim10}$ alkyl group; a is an integer of 1 and 2; b is an integer of 0 to 2; and $X_1$ is a single bond, —O—, —CO—, —COO—, or —OCO—,

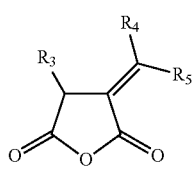

[Formula II]

wherein in [Formula II], $R_3$ to $R_5$ are each independently hydrogen or a halogen atom; or a $C_{1\sim10}$ alkyl group, a $C_{4\sim14}$ cycloalkyl group, a $C_{6\sim14}$ aryl group or a combination thereof,

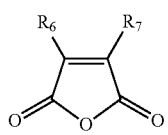

[Formula III]

wherein in [Formula III], $R_6$ and $R_7$ are each independently hydrogen or a halogen atom; or a $C_{1\sim10}$ alkyl group, a $C_{4\sim14}$ cycloalkyl group, a $C_{6\sim14}$ aryl group or a combination thereof, and

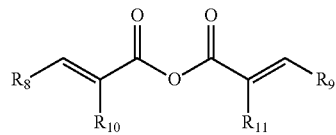

[Formula IV]

wherein in [Formula IV], $R_8$ to $R_{11}$ are each independently hydrogen or a halogen atom; or a $C_{1\sim10}$ alkyl group, a $C_{4\sim14}$ cycloalkyl group, a $C_{6\sim14}$ aryl group or a combination thereof.

5. The polarizing plate of claim 1, wherein the electron donor group of the vinyl-based compound is a functional group represented by the following [Formula A] or [Formula B]:

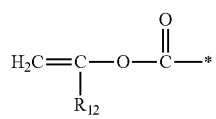

[Formula A]

wherein in [Formula A], $R_{12}$ is hydrogen or a $C_{1\sim10}$ alkyl group, and

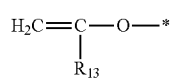

[Formula B]

wherein in [Formula B], $R_{13}$ is hydrogen or a $C_{1\sim10}$ alkyl group.

6. The polarizing plate of claim 1, wherein the vinyl-based compound is a compound represented by the following [Formula V]:

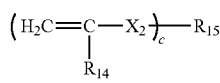

[Formula V]

wherein in [Formula V], $R_{14}$ is hydrogen or a $C_{1\sim10}$ alkyl group; $R_{15}$ is a c-valent $C_{1\sim10}$ aliphatic chain, a $C_{4\sim14}$ aliphatic ring, a $C_{6\sim14}$ aromatic ring, or a combination thereof; c is an integer of 1 to 4; and $X_2$ is —O— or —OCO—.

7. The polarizing plate of claim 1, wherein the radical curable composition further comprises a radical polymerizable compound represented by the following [Formula VI]:

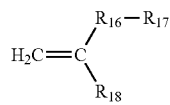

[Formula VI]

wherein in [Formula VI], $R_{16}$ is an ester group (—COO—), an amide group (—CON—), or a thioate group (—COS—); $R_{17}$ is a $C_{1\sim10}$ alkyl group, a $C_{4\sim10}$ cycloalkyl group, or a combination thereof, and in this case, $R_{17}$ has at least one hydroxy substituent in a molecule thereof; and $R_{18}$ is hydrogen, or a $C_{1\sim10}$ alkyl group.

8. The polarizing plate of claim 7, wherein the radical curable composition comprises 1 to 50 parts by weight of the acid anhydride-based compound and the vinyl-based compound; 40 to 97 parts by weight of the radical polymerizable compound; 1 to 10 parts by weight of the radical initiator; and 1 to 10 parts by weight of the cation generator based on 100 parts by weight of the entire composition.

9. The polarizing plate of claim 1, wherein the radical curable composition after curing has a glass transition temperature of 60° C. or more.

10. The polarizing plate of claim 1, wherein the radical curable composition has a viscosity of 10 to 200 cP.

11. The polarizing plate of claim 1, wherein the protective film has a thickness of 0.5 to 20 μm.

12. The polarizing plate of claim 1, wherein a protective film is further attached, through an adhesive layer, to a surface opposite to a surface of the polarizer, on which said protective layer is formed previously.

13. The polarizing plate of claim 1, further comprising an adhesion layer at an upper portion of the protective layer.

14. The polarizing plate of claim 1, wherein the polarizer is a polyvinyl alcohol-based film comprising iodine or a dichroic dye.

15. An image display device comprising the polarizing plate of claim 1.

* * * * *